United States Patent
Kim et al.

(10) Patent No.: US 11,528,405 B2
(45) Date of Patent: Dec. 13, 2022

(54) OPTICAL DEVICE AND MOBILE TERMINAL

(71) Applicant: LG ELECTRONICS INC., Seoul (KR)

(72) Inventors: Jongpil Kim, Seoul (KR); Sungmin Woo, Seoul (KR); Dongjin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 16/981,335

(22) PCT Filed: Oct. 16, 2018

(86) PCT No.: PCT/KR2018/012195
§ 371 (c)(1),
(2) Date: Sep. 16, 2020

(87) PCT Pub. No.: WO2019/177217
PCT Pub. Date: Sep. 19, 2019

(65) Prior Publication Data
US 2021/0063613 A1   Mar. 4, 2021

Related U.S. Application Data

(60) Provisional application No. 62/643,771, filed on Mar. 16, 2018.

(51) Int. Cl.
*H04N 5/232* (2006.01)
*G02B 3/14* (2006.01)
(Continued)

(52) U.S. Cl.
CPC ......... *H04N 5/232122* (2018.08); *G02B 3/14* (2013.01); *G02B 7/04* (2013.01);
(Continued)

(58) Field of Classification Search
CPC .......... H04N 5/232122; H04N 5/2253; H04N 5/2254; H04N 5/232123; H04N 5/23264;
(Continued)

(56) References Cited

U.S. PATENT DOCUMENTS 7,324,287 B1 * 1/2008 Collier ................. G02B 3/14
   359/666
9,128,350 B1   9/2015 Lee
(Continued)

FOREIGN PATENT DOCUMENTS

EP   2996325    3/2016
EP   3255491    12/2017
(Continued)

OTHER PUBLICATIONS

Schuhladen, "Miniaturized tunable apertures", Research in Micro-optics, vol. 20, XP055438238, http://d-nb.info/1119452724/34, Jan. 2016, 178 pages.

(Continued)

*Primary Examiner* — Shahbaz Nazrul
(74) *Attorney, Agent, or Firm* — Lee, Hong, Degerman, Kang & Waimey PC

(57) ABSTRACT

The present invention relates to a mobile terminal comprising a liquid lens including: a side wall part; a first and a second glass layer which cover one surface and the other surface of the side wall part, respectively, to form a receiving part; a plurality of electrode modules, each of which is positioned on the side wall part and includes a first and a second electrode; an insulation layer covering the first electrode; a nonpolar liquid filled in the receiving part; and a polar liquid which is separated from the polar liquid in layers, is filled in the receiving part, and is in contact with the second electrode, wherein a boundary surface between the nonpolar liquid and the polar liquid changes into a shape (Continued)

protruding toward the polar liquid as a voltage applied to the electrode modules increases, and a control part differently controls at least a part of the voltage applied to the plurality of electrode modules to adjust a position of a protrusion of the boundary surface.

11 Claims, 17 Drawing Sheets

(51) Int. Cl.

| | | |
|---|---|---|
| H04N 5/225 | (2006.01) | |
| G02F 1/29 | (2006.01) | |
| G02B 7/04 | (2021.01) | |
| G02B 26/00 | (2006.01) | |
| G06F 3/041 | (2006.01) | |
| G02B 7/09 | (2021.01) | |
| H04M 1/02 | (2006.01) | |

(52) U.S. Cl.
CPC ............. *G02B 7/09* (2013.01); *G02B 26/004* (2013.01); *G02B 26/005* (2013.01); *G02F 1/29* (2013.01); *G06F 3/041* (2013.01); *H04M 1/0264* (2013.01); *H04N 5/2253* (2013.01); *H04N 5/2254* (2013.01); *H04N 5/23264* (2013.01); *H04N 5/232123* (2018.08); *H04N 5/232935* (2018.08); *G02F 1/294* (2021.01)

(58) Field of Classification Search
CPC ...... H04N 5/232935; G02B 3/14; G02B 7/04; G02B 7/09; G02B 26/004; G02B 26/005; G02B 2207/115; G02B 5/005; G02B 7/08; G02B 7/36; G02F 1/29; G02F 1/294; G06F 3/041; H04M 1/0264; H04M 2250/52

See application file for complete search history.

(56) References Cited

U.S. PATENT DOCUMENTS

| | | | |
|---|---|---|---|
| 9,910,246 B2 | 3/2018 | Zohrabyan et al. | |
| 2009/0072037 A1 | 3/2009 | Good et al. | |
| 2009/0171620 A1 | 7/2009 | Addy | |
| 2009/0213321 A1 | 8/2009 | Galstian et al. | |
| 2009/0302197 A1* | 12/2009 | Uchino | H04N 5/23212 250/201.4 |
| 2010/0254021 A1* | 10/2010 | Yoshida | G02B 3/14 359/666 |
| 2010/0295987 A1 | 11/2010 | Berge | |
| 2012/0013760 A1 | 1/2012 | Parodi-Keravec et al. | |
| 2012/0140167 A1 | 6/2012 | Blum | |
| 2013/0128223 A1* | 5/2013 | Wood | A61B 1/267 351/246 |
| 2013/0306480 A1* | 11/2013 | Chang | G02B 26/005 204/547 |
| 2014/0191107 A1 | 7/2014 | Lee et al. | |
| 2015/0085173 A1 | 3/2015 | Chun et al. | |
| 2015/0223669 A1* | 8/2015 | Goldfain | A61B 1/00105 600/109 |
| 2016/0360121 A1* | 12/2016 | Cheng | H04N 13/239 |
| 2017/0094210 A1 | 3/2017 | Galor Gluskin | |
| 2019/0279354 A1* | 9/2019 | Inazumi | B25J 9/1664 |

FOREIGN PATENT DOCUMENTS

| | | |
|---|---|---|
| JP | 2012128029 | 7/2012 |
| JP | 2014186227 | 10/2014 |
| JP | 2015108712 | 6/2015 |
| KR | 100835108 | 6/2008 |
| KR | 1020090018579 | 2/2009 |
| KR | 1020140008699 | 1/2014 |
| KR | 1020140089852 | 7/2014 |
| KR | 1020140111062 | 9/2014 |
| KR | 1020150100394 | 9/2015 |
| KR | 1020150113538 | 10/2015 |
| KR | 1020160074658 | 6/2016 |
| KR | 1020170067634 | 6/2017 |
| KR | 1020170139982 | 12/2017 |
| KR | 101821189 | 1/2018 |
| WO | 2017188798 | 11/2017 |

OTHER PUBLICATIONS

European Patent Office Application Serial No. 18910169.4, Search Report dated Nov. 30, 2021, 6 pages.
European Patent Office Application Serial No. 18909706.6, Search Report dated Dec. 6, 2021, 10 pages.
European Patent Office Application Serial No. 18909504.5, Search Report dated Dec. 7, 2021, 12 pages.
U.S. Appl. No. 16/981,641, Notice of Allowance dated Dec. 29, 2021, 17 pages.
PCT International Application No. PCT/KR2018/012205, Notification of Transmittal of the International Search Report and the Written Opinion of the International Searching Authority, or Declaration dated Feb. 7, 2019, 10 pages.
PCT International Application No. PCT/KR2018/012199, Notification of Transmittal of the International Search Report and the Written Opinion of the International Searching Authority, or Declaration dated Feb. 14, 2019, 11 pages.
PCT International Application No. PCT/KR2018/012195, Notification of Transmittal of the International Search Report and the Written Opinion of the International Searching Authority, or Declaration dated Jan. 22, 2019, 11 pages.
PCT International Application No. PCT/KR2018/012207, Notification of Transmittal of the International Search Report and the Written Opinion of the International Searching Authority, or Declaration dated Jan. 31, 2019, 13 pages.

* cited by examiner

[FIG. 1a]
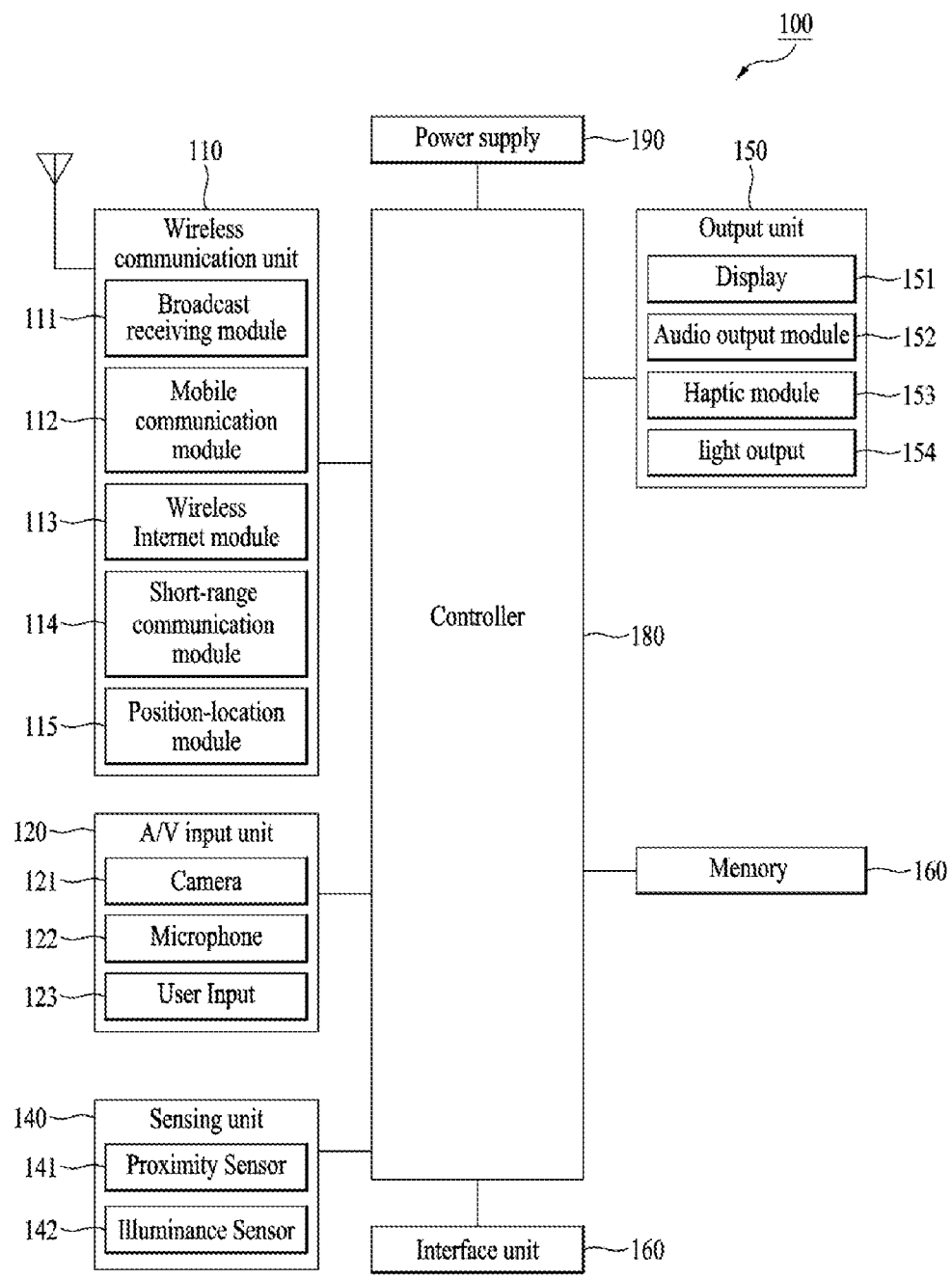

[FIG. 1b]
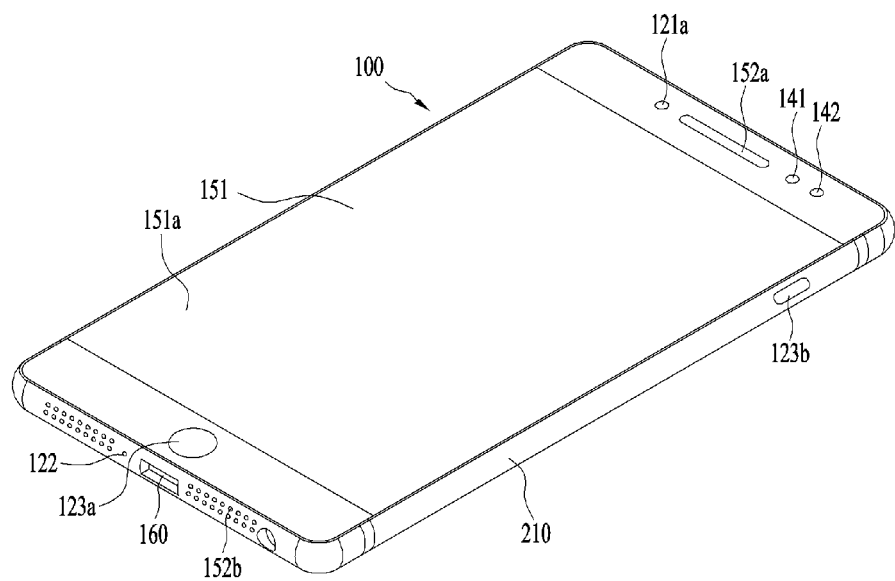
[FIG. 1c]
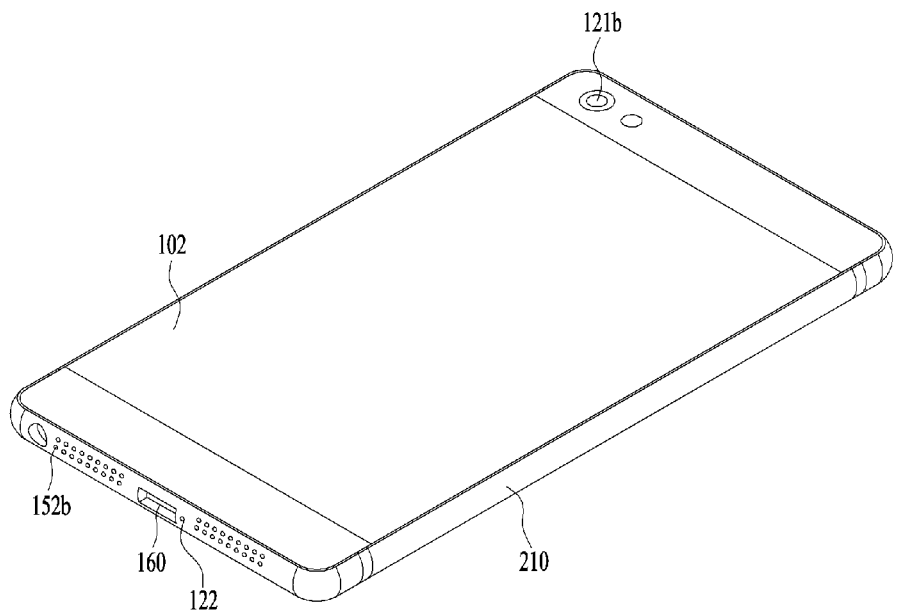

[FIG. 2]
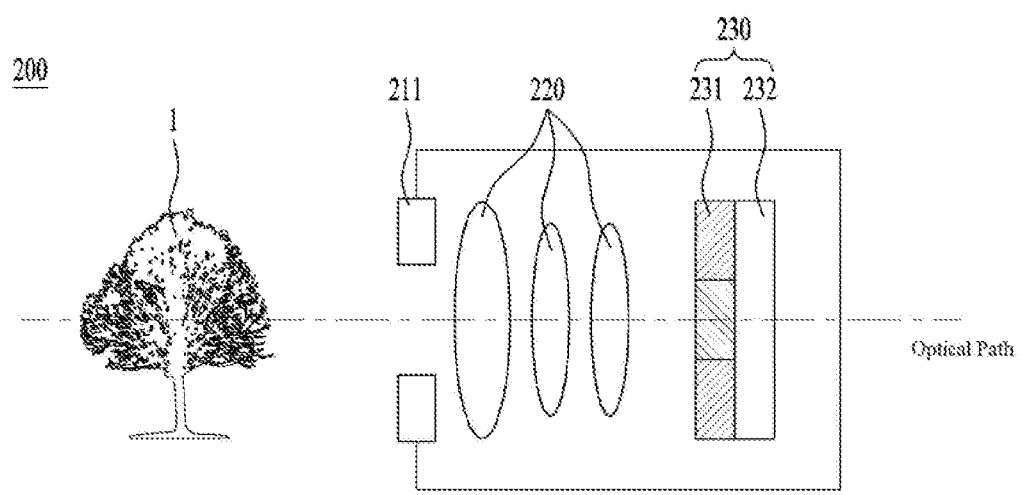

[FIG. 3]
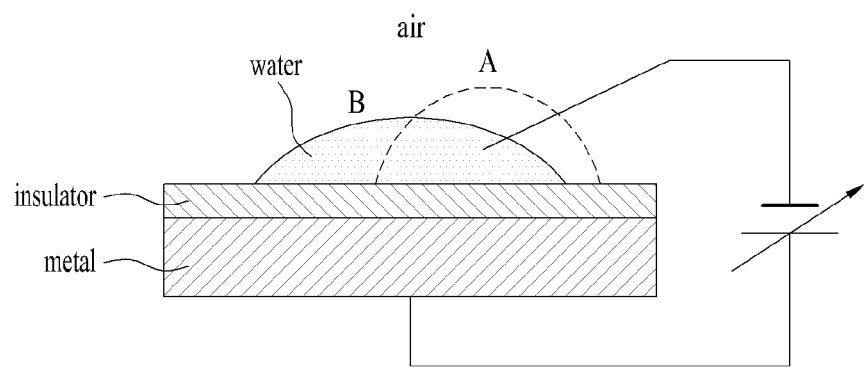
(a)
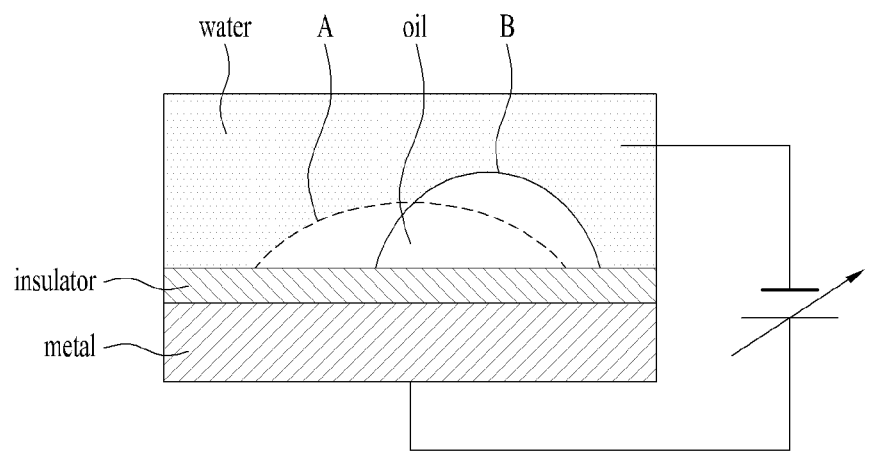
(b)

[FIG. 4]
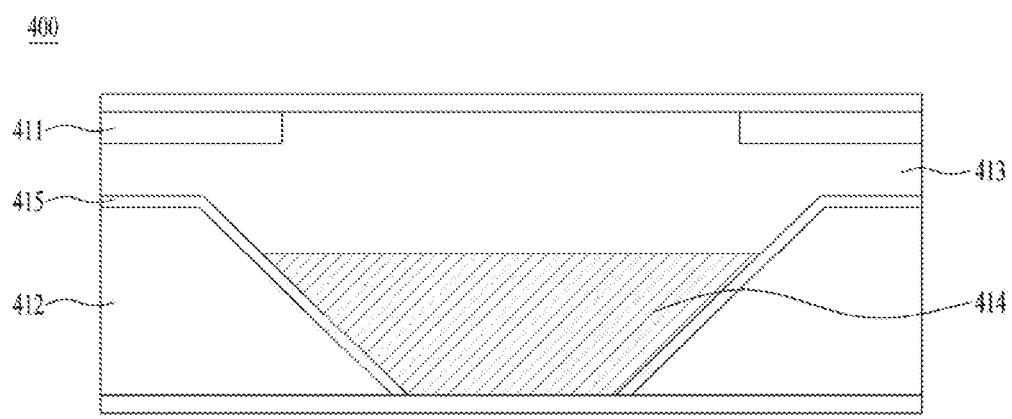

[FIG. 5]
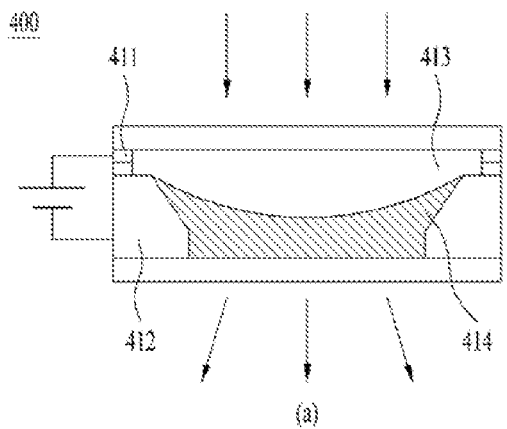
(a)
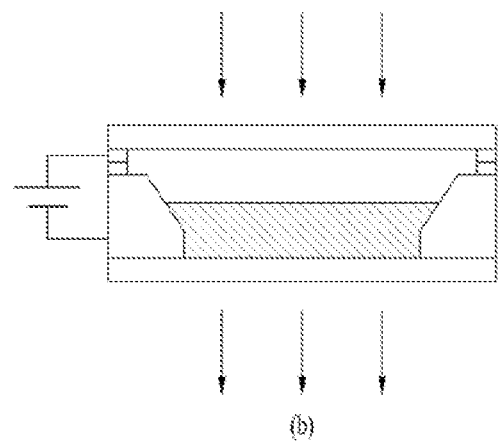
(b)
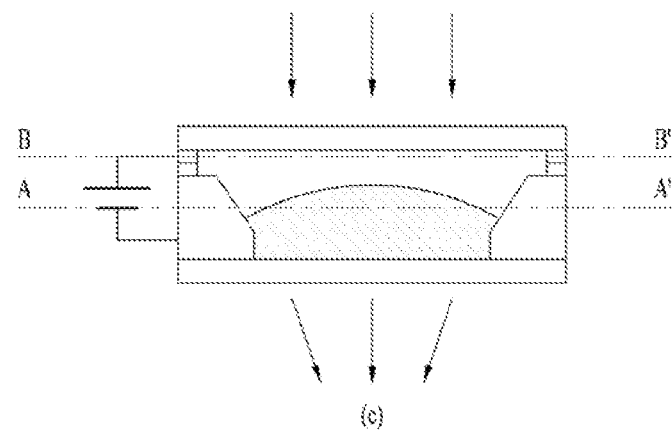
(c)

[FIG. 6a]
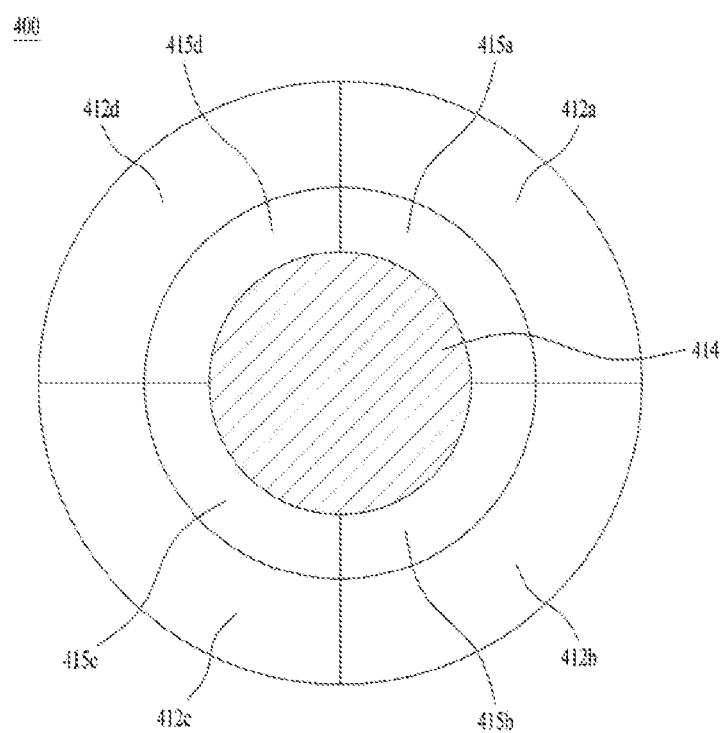

[FIG. 6b]
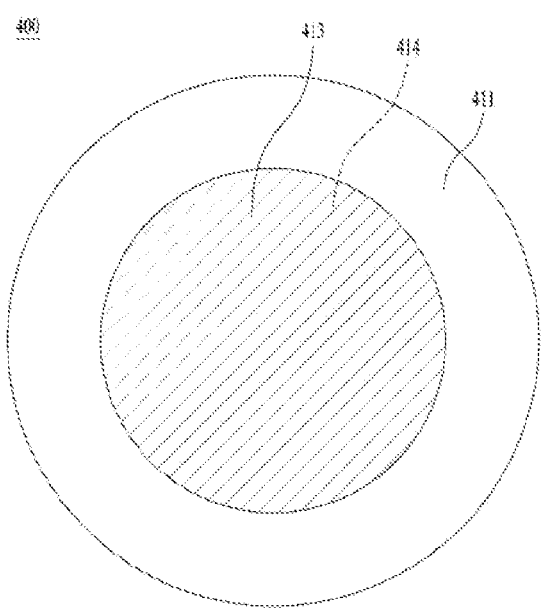

[FIG. 7]
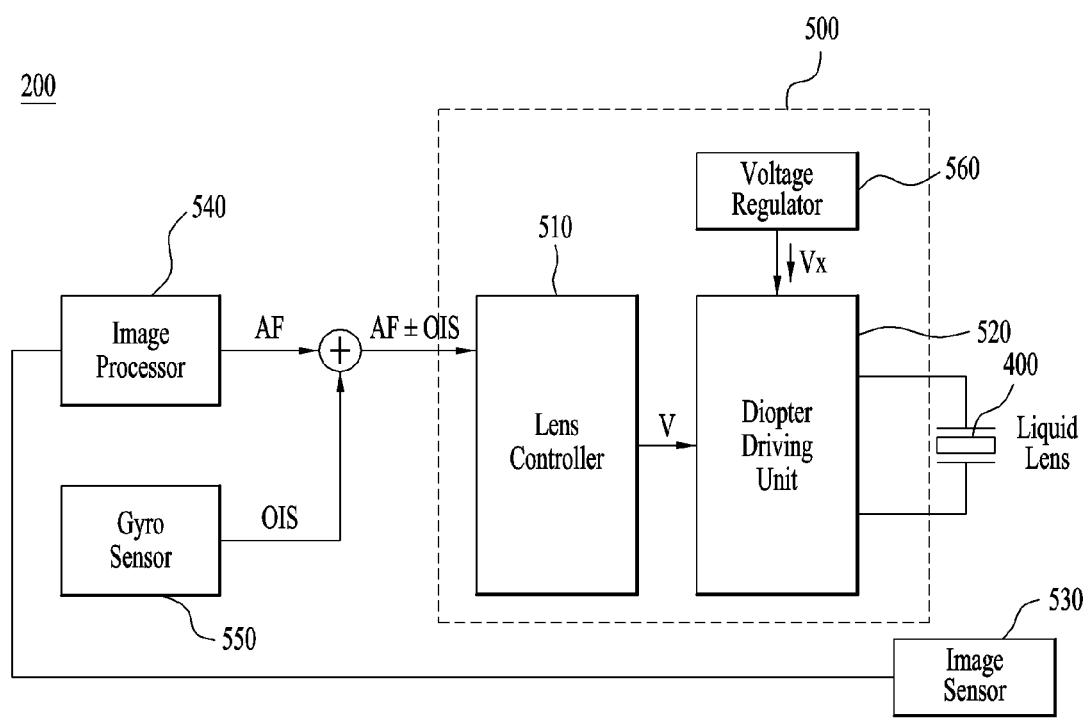

[FIG. 8]
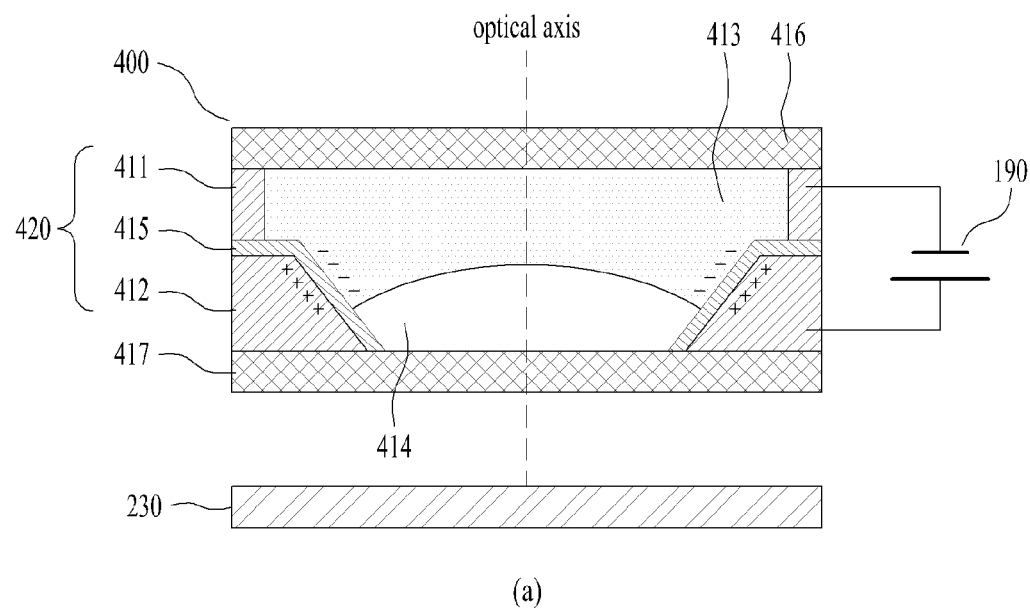
(a)
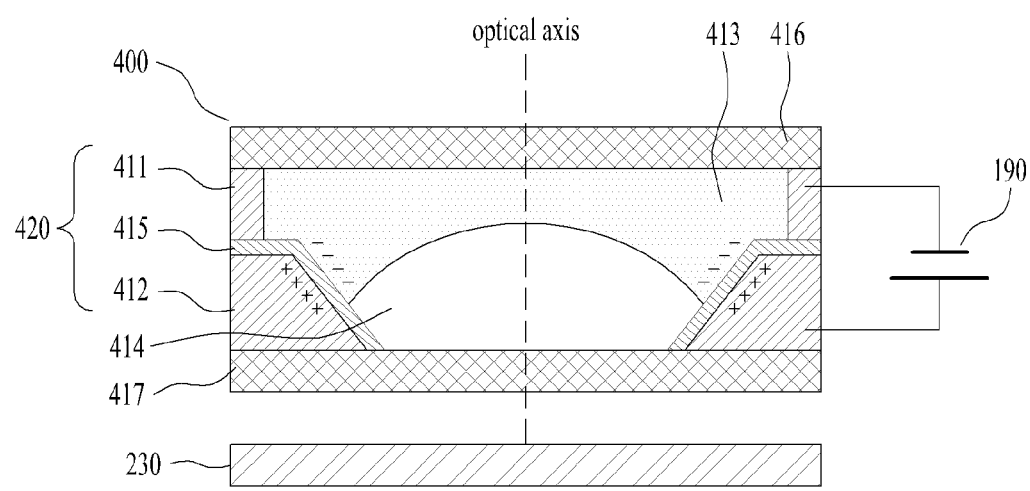
(b)

[FIG. 9]
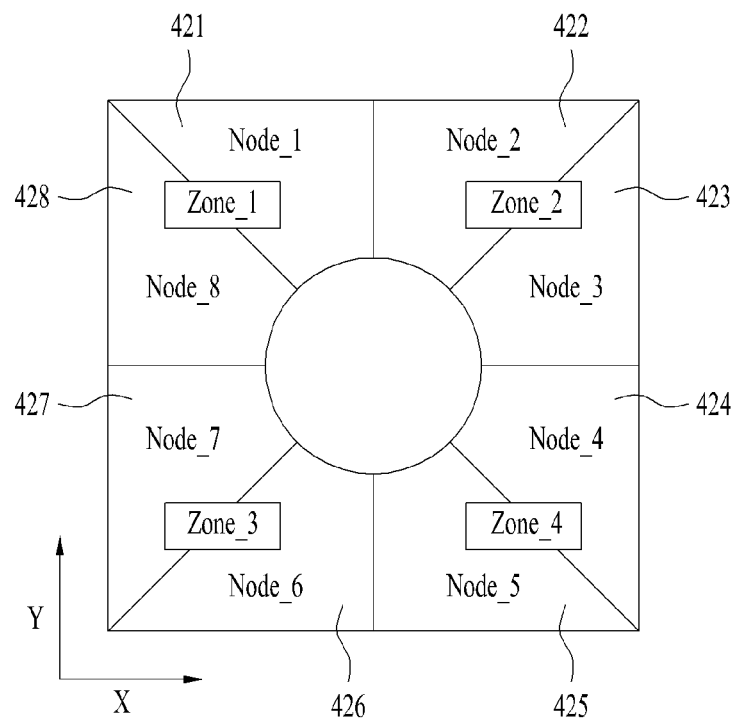
$$V_1 = V_{AF} \times \triangle V_1$$
$$V_2 = V_{AF} \times \triangle V_2$$
$$V_3 = V_{AF} \times \triangle V_3$$
$$V_4 = V_{AF} \times \triangle V_4$$
$$V_5 = V_{AF} \times \triangle V_5$$
$$V_6 = V_{AF} \times \triangle V_6$$
$$V_7 = V_{AF} \times \triangle V_7$$
$$V_8 = V_{AF} \times \triangle V_8$$

[FIG. 10]
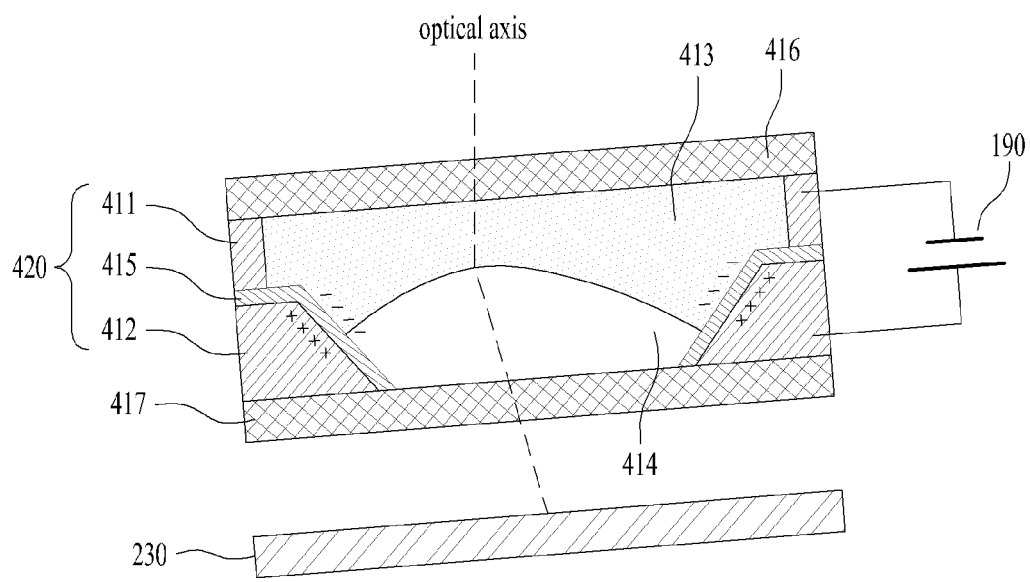
$$\triangle V_{2,3} = K \times (\theta x + \theta y)$$
$$\triangle V_{8,1} = K \times (-\theta x + \theta y)$$
$$\triangle V_{6,7} = K \times (-\theta x - \theta y)$$
$$\triangle V_{4,5} = K \times (\theta x - \theta y)$$
※ K : compensation voltage coefficient

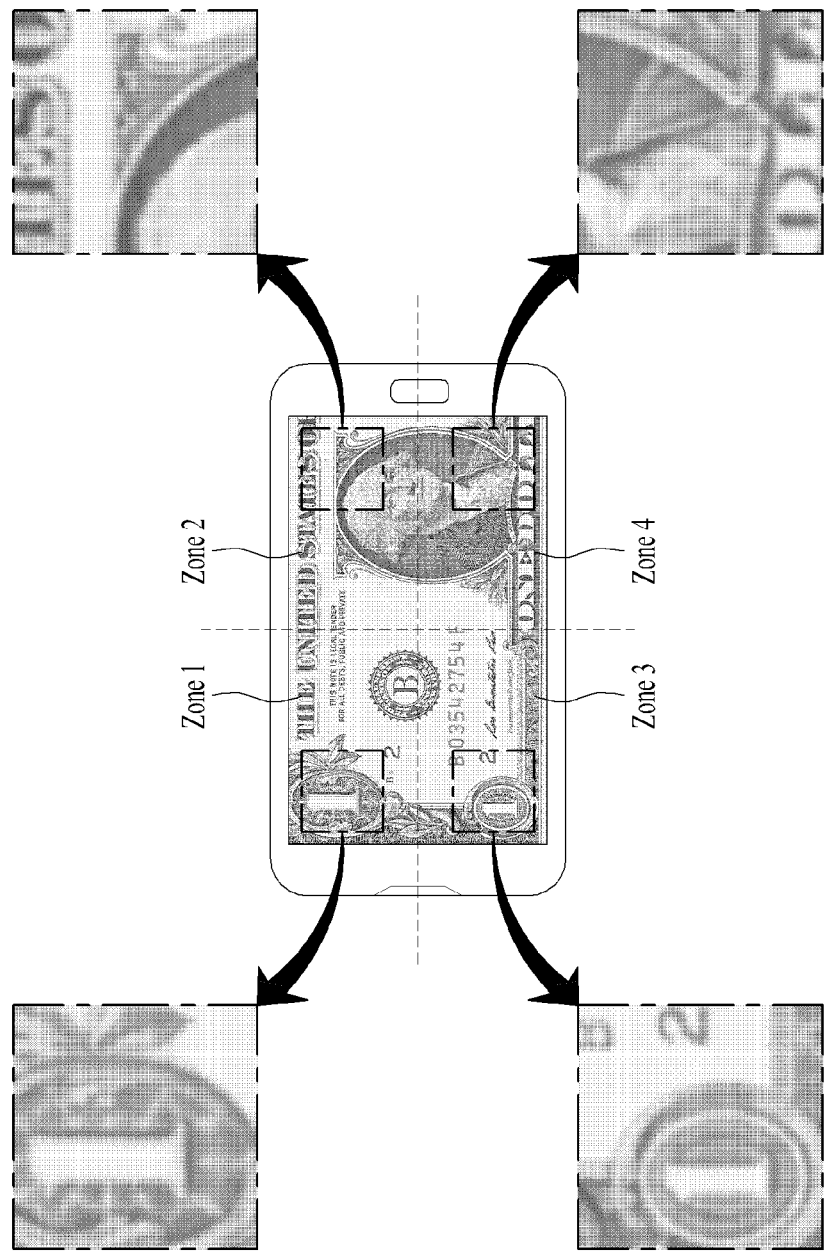
[FIG. 11]

[FIG. 12]
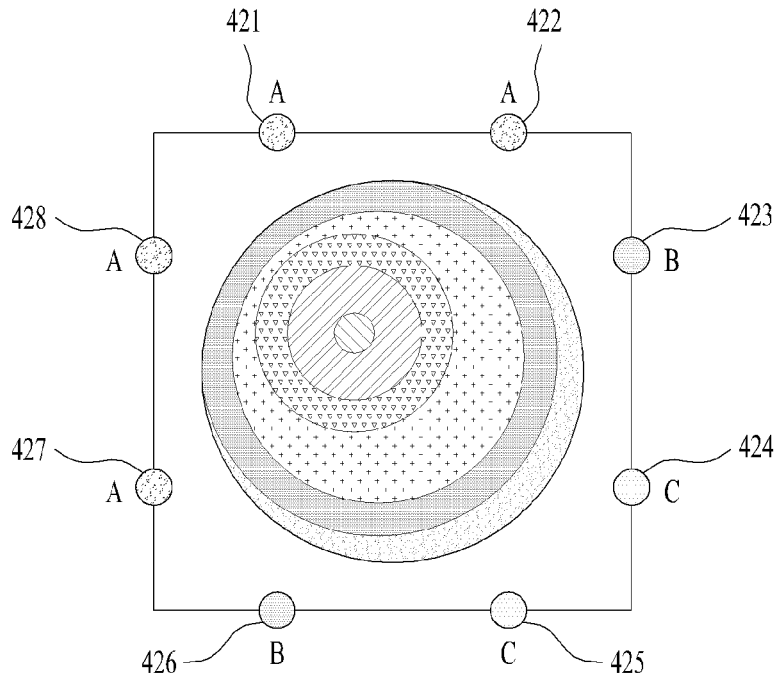
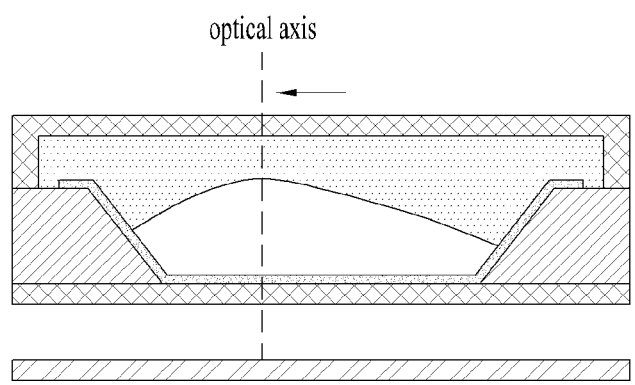
For touch AF Zone_1
$\triangle V_{1,8} = K \times A(-\theta x + \theta y)$
$\triangle V_2 = K \times A(\theta x + \theta y), \triangle V_7 = K \times A(-\theta x - \theta y)$
$\triangle V_3 = K \times B(\theta x + \theta y), \triangle V_6 = K \times B(-\theta x - \theta y)$
$\triangle V_{4,5} = K \times C(\theta x - \theta y)$
※ A, B, C weight voltage coefficient ( A > B > C )

[FIG. 13]
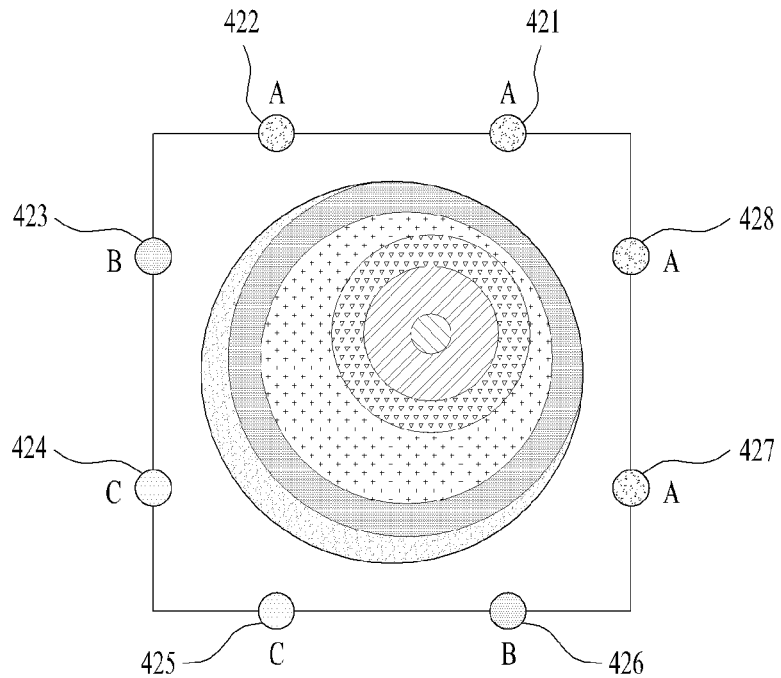
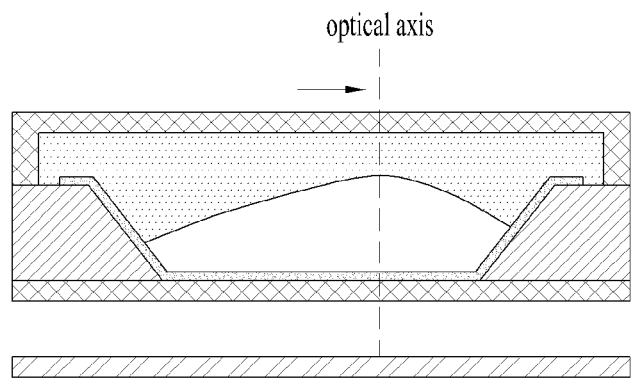
For touch AF Zone_2
$\triangle V_{2,3} = K \times A\,(\theta x + \theta y)$
$\triangle V_1 = K \times A\,(-\theta x + \theta y)$, $\triangle V_4 = K \times A\,(\theta x - \theta y)$
$\triangle V_5 = K \times B\,(\theta x - \theta y)$, $\triangle V_8 = K \times B\,(-\theta x + \theta y)$
$\triangle V_{6,7} = K \times C\,(-\theta x - \theta y)$

[FIG. 14]
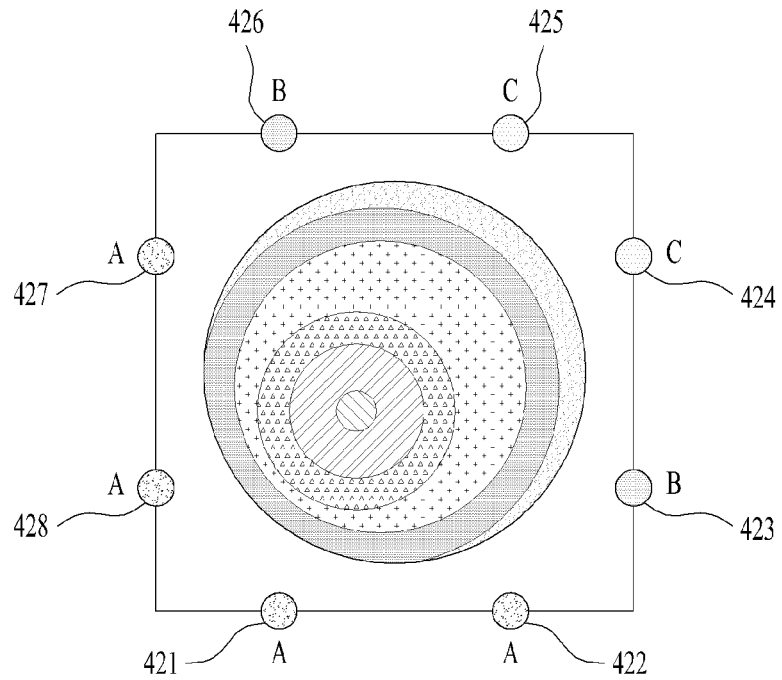
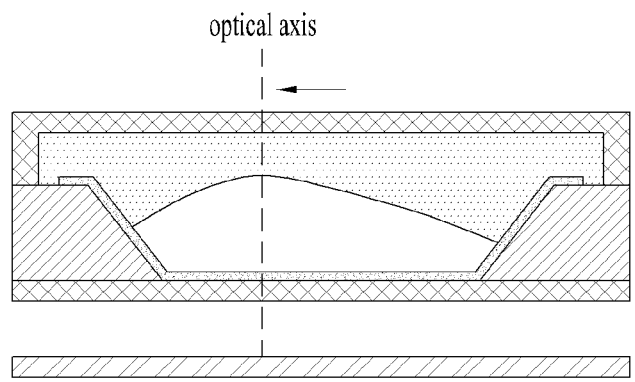
For touch AF Zone_3
$\triangle V_{6,7} = K \times A(-\theta x - \theta y)$
$\triangle V_5 = K \times A(\theta x - \theta y), \triangle V_8 = K \times A(-\theta x + \theta y)$
$\triangle V_1 = K \times B(-\theta x + \theta y), \triangle V_4 = K \times B(\theta x - \theta y)$
$\triangle V_{2,3} = K \times C(\theta x + \theta y)$

[FIG. 15]
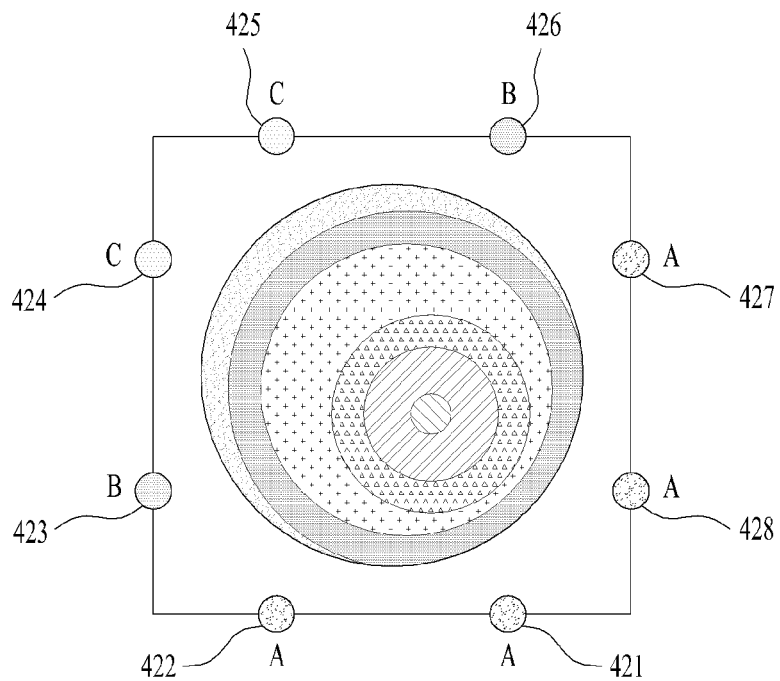
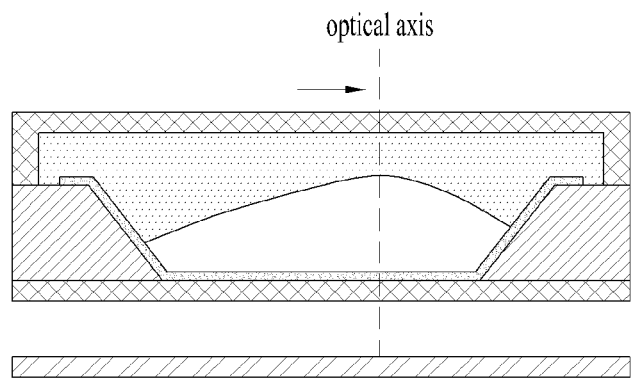
For touch AF Zone_4
$\triangle V_{4,5} = K \times A(\theta x - \theta y)$
$\triangle V_3 = K \times A(\theta x + \theta y)$, $\triangle V_6 = K \times A(-\theta x - \theta y)$
$\triangle V_2 = K \times B(\theta x + \theta y)$, $\triangle V_7 = K \times B(-\theta x - \theta y)$
$\triangle V_{1,8} = K \times C(-\theta x + \theta y)$

OPTICAL DEVICE AND MOBILE TERMINAL

CROSS-REFERENCE TO RELATED APPLICATIONS

This application is the National Stage filing under 35 U.S.C. 371 of International Application No. PCT/KR2018/012195, filed on Oct. 16, 2018, which claims the benefit of U.S. Provisional Application No. 62/643,771, filed on Mar. 16, 2018, the contents of which are all hereby incorporated by reference herein in their entirety.

TECHNICAL FIELD

The present disclosure relates to an optical device and a mobile terminal including the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal may support more complicated functions such as capturing images or video, reproducing music or video files, playing games, receiving broadcast signals, and the like. By comprehensively and collectively implementing such functions, the mobile terminal may be embodied in the form of a multimedia player or device.

As one of the functions of multimedia devices, photo-taking is a very important function. Since the performance of a camera is related to the overall performance of a mobile terminal, a camera capable of providing high-quality images and allowing miniaturization is an active research area. Recently, the camera function of a mobile terminal has reached the level of replacing a digital camera, and a small camera module may be mounted and utilized in various devices.

There is a need for an optical device capable of shooting in a variety of situations, such as a camera capable of correcting hand tremors, taking a night view, or taking an ultra-close-up shot beyond the level of shooting a general situation.

DISCLOSURE

Technical Problem

An aspect of the present disclosure is to provide an optical device with a liquid lens capable of taking an ultra-close-up shot.

Technical Solution

A mobile terminal includes a case, an image sensor mounted in the case, a liquid lens located in front of the image sensor, a touch display located on one surface of the case and outputting a preview image input to the image sensor, and recognizing a touch input, and a controller configured to control the image sensor, the liquid lens, and the touch display. The liquid lens includes a sidewall, a first glass layer and a second glass layer forming a container by covering one surface and the other surface of the sidewall, a plurality of electrode modules located on the sidewall and including an upper electrode and a lower electrode, an insulating layer covering the upper electrode, a non-polar liquid filled in the container, and a polar liquid layered with the polar liquid, filled in the container, and contacting the lower electrode. As a voltage applied to an electrode module increases, an interface between the non-polar liquid and the polar liquid is changed to protrude toward the polar liquid, and the controller is configured to adjust the position of a protrusion of the interface by controlling at least a part of voltages applied to the plurality of electrode modules to be different.

The plurality of electrode modules may be arranged along a periphery of the liquid lens, and the number of the plurality of electrode modules may be 8 or larger.

When a first zone of the preview image is selected, the controller may be configured to control the electrode modules to protrude the interface of the polar liquid at a position corresponding to the first zone.

The controller may be configured to set a position at which a touch input is sensed on the touch display as a first point.

Each of the voltages applied to the electrode modules may include a focus voltage $V_{AF}$ corresponding to a focus which has been set and a compensation voltage $\Delta V$ compensating for shaking of the mobile terminal.

The first zone may include one of a plurality of zones divided from the preview image, and the electrode modules may include at least two of electrode modules one to one corresponding to the plurality of zones.

The controller may be configured to control voltages of a plurality of first electrode modules including an electrode module corresponding to the first zone and an electrode module corresponding to a zone adjacent to the first zone to be lower than a voltage of a second electrode module corresponding to a second zone apart from the first zone in a diagonal direction.

A first voltage coefficient A for the compensation voltages of the first electrode modules may be larger than a second voltage coefficient C for the second electrode module.

A third voltage coefficient B for a third electrode module other than the first electrode module and the second electrode module may be smaller than the first voltage coefficient A and smaller than the second voltage coefficient C.

A curvature center of the protrusion of the interface after the first point is set may be different from a curvature center of the protrusion of the interface before the first point is set.

The controller may be configured to, upon sensing a command for storing the preview image, obtain a plurality of preview images by adjusting the voltages of the electrode modules to change the position of the protrusion of the interface, and control an image obtained by combining images corresponding to the protrusion in the preview images to be stored.

The sidewall may have an inclined surface which becomes narrower toward the first glass layer.

The non-polar liquid may have a larger refractive index than the polar liquid.

Advantageous Effects

A mobile terminal according to the present disclosure has the following effects.

An ultra-close-up shot may be taken with a desired part focused on. Therefore, a clear image of a user-desired part may be obtained.

A clearer ultra-close-up image may be obtained by solving the problem of burring in an out-of-focus peripheral part of the image during ultra-close-up shooting.

An additional scope of applicability of the present disclosure will become apparent from the following detailed description. However, since various changes and modifications within the spirit and scope of the present disclosure can be clearly understood by those skilled in the art, the detailed description and a specific embodiment such as a preferred embodiment of the present disclosure should be understood as given by way of example only.

BRIEF DESCRIPTION OF THE DRAWINGS

FIG. 1a is a block diagram illustrating a mobile terminal related to the present disclosure.

FIGS. 1b and 1c are conceptual diagrams illustrating an exemplary mobile terminal related to the present disclosure, viewed from different directions.

FIG. 2 is a conceptual sectional diagram illustrating an optical device related to the present disclosure.

FIG. 3 is a diagram referred to for describing an electro-wetting technology related to the present disclosure.

FIG. 4 is a conceptual sectional view illustrating an electro-wetting liquid lens related to the present disclosure.

FIG. 5 is a diagram conceptually illustrating cross-sections of the electro-wetting liquid lens of FIG. 4 according to voltages applied to the electro-wetting liquid lens.

FIG. 6a is a conceptual sectional view illustrating the electro-wetting liquid lens of FIG. 5(c), taken along line A-A'.

FIG. 6b is a conceptual sectional view illustrating the electro-wetting liquid lens of FIG. 5(c), taken along line B-B'.

FIG. 7 is a driving block diagram illustrating an optical device including an electro-wetting liquid lens related to the present disclosure.

FIG. 8 is a sectional view illustrating the optical device related to the present disclosure.

FIG. 9 is a diagram illustrating an electrode module in the optical device related to the present disclosure.

FIG. 10 is a diagram referred to for describing an operation of the optical device related to the present disclosure.

FIG. 11 is a diagram illustrating a preview image output to a touch display in the mobile terminal related to the present disclosure.

FIGS. 12 to 15 are diagrams referred to for describing a method of controlling a liquid lens in the mobile terminal related to the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Reference is now made to FIGS. 1a to 1c, where FIG. 1a is a block diagram of a mobile terminal in accordance with the present disclosure, and FIGS. 1b and 1c are conceptual views of one example of the mobile terminal, viewed from different directions.

A mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

Further, the controller 180 controls some or all of the components illustrated in FIG. 1*a* to execute an application program that has been stored in the memory 170. Further, the controller 180 may operate at least two of the components included in the mobile terminal 100 in combination to execute the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above-described components may operate in cooperation with each other to implement operations, control, or control method of the mobile terminal 100 according to various embodiments described below. Further, the operations, control, or control method of the mobile terminal may be performed in the mobile terminal by executing at least one application program stored in the memory 170.

Referring to FIGS. 1*b* and 1*c*, the mobile terminal 100 includes a bar-type terminal body. However, the present disclosure is applicable to various structures including a watch type, a clip type, a glass type, a folder type having two or more bodies engaged with each other to be relatively movable, a flip type, a slide type, a swing type, a swivel type, and so on, not limited to the bar type. While the present disclosure relates to a specific type of optical device, a description of the specific type of optical device is generally applicable to other types of optical devices.

The terminal body may be understood conceptually as referring to the mobile terminal 100 as at least one aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal includes a display unit 151, a first and a second audio output modules 152*a*/152*b*, a proximity sensor 141, an illumination sensor 142, an optical output module 154, a first and a second cameras 121*a*/121*b*, a first and a second manipulation units 123*a*/123*b*, a microphone 122, interface unit 160 and the like.

It will be described for the mobile terminal as shown in FIGS. 1B and 1C. The display unit 151, the first audio output module 152*a*, the proximity sensor 141, an illumination sensor 142, the optical output module 154, the first camera 121*a* and the first manipulation unit 123*a* are arranged in front surface of the terminal body, the second manipulation unit 123*b*, the microphone 122 and interface unit 160 are arranged in side surface of the terminal body, and the second audio output modules 152*b*, and the second camera 121*b* are arranged in rear surface of the terminal body.

However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented as a receiver that provides a call sound to a user's ear. The second audio output module 152*b* may be implemented in the form of a loud speaker to output alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1*b* illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is configured to receive a user's voice and other sounds. Microphones 122 may be provided at a plurality of positions such that they may receive stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject.

As shown in FIG. 1b, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

FIG. 2 is a conceptual sectional diagram illustrating an optical device 200 related to the present disclosure. The optical device 200 illustrated in FIG. 2 is an example of the camera 121 included in the mobile terminal 100 in FIG. 1a.

The optical device 200 may include an aperture 211, at least one lens 220, and an image sensor 230.

Light reflected or emitted from a subject 1 passes through at least one lens 220 and is refracted. The light which has passed and refracted from the at least one lens 220 reaches the image sensor 230.

The aperture 211 is located at a point in front of the at least one lens 220 in an optical path and adjusts the amount of light reaching the at least one lens 220 and the image sensor 230.

The image sensor 230 may include a red, green, blue (RGB) filter 231 for sensing RGB and a sensor array 232 for converting an optical signal into an electrical signal.

The image sensor 230 may include a mask for phase difference detection at the top or bottom of the RGB filter 231.

An image processor (not shown) may generate an RGB image based on the electrical signal obtained from the image sensor 230.

A plurality of lenses 220 may be provided, and may have a fixed shape such as a glass lens or a plastic lens.

However, when the at least one lens 220 has a fixed shape like a glass lens or a plastic lens and thus a fixed refractive index, the at least one lens 220 has limitations in executing functions such as auto focusing (AF) or image shake correction.

To solve the problem, the at least one lens 220 may be a liquid lens in a variable shape.

Liquid lenses may be classified into a membrane liquid lens deformed by external physical pressure and an electro-wetting liquid lens deformed by electrical interaction.

It may be more easily control the refractive index of the electro-wetting liquid lens than that of the membrane liquid lens, in that the former relies on external physical pressure and the latter relies on external physical pressure, for deformation.

FIG. 3 is a diagram referred to for describing an electro-wetting technology related to the present disclosure. (a) illustrates a case in which a polar liquid such as water is positioned on a substrate with an insulator deposited on a metal thereon. Water droplets are clustered in a circle due to surface tension, as indicated by a dotted line A. When electricity is applied by connecting electrodes to the water droplets and the metal, electric current flows through the water droplets and the substrate. Thus, the water droplets form a gentle curve and spread on the substrate, as indicated by a solid line B.

When the voltage is equal to or higher than a predetermined level, the water is electrolyzed. However, if the insulator is interposed between a conductive object and the water as illustrated in FIG. 3(*a*), water molecules may not directly exchange electrons, so that decomposition does not take place. A liquid lens having a variable curvature may be implemented by this electro-wetting technology.

For a conventional glass lens, the position of the lens is changed to adjust a focal length, whereas for a liquid lens, a focus may be adjusted by adjusting a voltage and thus changing the curvature of a liquid, which obviates the need for changing the position of the lens. The liquid lens may be implemented in a smaller space than the conventional glass lens and freely change its shape, compared to the glass lens fixed in its shape. Accordingly, the liquid lens allows various controls.

As illustrated in FIG. 3(*b*), a liquid lens may be implemented by filling a polar liquid (water) and a non-polar liquid (oil) in a container including a substrate with a conductive object and an insulator deposited on one surface thereof. In this embodiment, the interface between the polar liquid and the non-polar liquid which have different refractive indices serves as the spherical surface of the lens, and the shape of the interface may be controlled by adjusting a voltage applied to the polar solution and the metal.

In the embodiment of FIG. 3(*b*), the liquid lens is easier to control because the interface between the polar liquid and the non-polar liquid may be changed within a limited space than that of FIG. 3(*a*). The polar liquid and the non-polar solution are placed in the container, forming the interface without being mixed, as illustrated in FIG. 3(*b*). When a current is applied to the polar liquid, the hydrophile property of the substrate becomes strong, and the interface between the polar liquid and the non-polar liquid changes such that an area over which the substrate contacts the polar liquid increases. That is, the interface changes from a gentle shape indicated by a dotted line A to a round shape indicated by a solid line B.

A convex lens may be implemented using a non-polar liquid having a larger refractive index than a polar liquid, and a concave lens may be implemented using a polar liquid having a larger refractive index than a non-polar liquid.

FIG. 4 is a conceptual sectional view illustrating an electro-wetting liquid lens 400 related to the present disclosure.

The shape of the electro-wetting liquid lens 400 is adjusted by generating a potential difference and thus changing the electron configuration of a material.

The electro-wetting liquid lens 400 includes an upper electrode 411 and a lower electrode 412.

A current may flow through the upper electrode 411 and the lower electrode 412 to generate a potential difference. At least one of the upper electrode 411 or the lower electrode 412 may include a plurality of terminals. Particularly, the lower electrode 412 may be provided as a plurality of terminals with respect to the cross-section of the liquid lens, which will be described later in detail.

As a current flows through the upper electrode 411 or the lower electrode 412, the electron configuration of a conductive solution 413 is changed. The resulting interaction between electrons changes the shape of the conductive solution 413.

A liquid 414 may have a relatively specific refractive surface due to the shape deformation of the conductive solution 413 and may function as a lens for refracting light in the electro-wetting liquid lens 400.

That is, as the shape of the liquid 414 is changed, a refractive index, a focal length, or a refraction direction is changed.

The shapes of the upper electrode 411 and the lower electrode 412 affect the shapes of the conductive solution 413 and the liquid 414. For example, when the liquid 414 is provided in a separation space of the lower electrode 412 and the lower electrode 412 is inclined so that left and right widths thereof become narrower toward the top, the largest force is applied to the edges of the liquid 414, and thus the liquid 414 is curved differently like a lens shape.

A non-conductive layer 415 is provided on the top surface of the lower electrode 412 to prevent a current from directly flowing between the conductive solution 413 and the lower electrode 412.

FIG. 5 is a diagram conceptually illustrating cross-sections of the electro-wetting liquid lens 400 of FIG. 4 according to voltages applied to the electro-wetting liquid lens 400.

As described above, the shape of the liquid 414 changes according to the potential difference between the upper electrode 411 and the lower electrode 412.

In FIGS. 5(*a*), 5(*b*) and 5(*c*), the potential difference between the upper electrode 411 and the lower electrode 412 increases sequentially. The liquid lens 414 changes in shape to switch from the properties of a concave lens to the properties of a convex lens in the order of FIG. 5(*a*) to FIG. 5(*c*).

That is, as the potential difference between the upper electrode 411 and the lower electrode 412 increases, the diopter of the electro-wetting liquid lens 400 increases. This means that when the liquid 414 is in the state of a concave lens, the lens curvature decreases as the potential difference increases, and when the liquid 414 is in the state of a convex lens, the lens curvature increases as the potential difference increases.

While the liquid lens 414 is shown in FIG. 5 as having a symmetric curved surface or flat surface, the liquid lens 414 may also have an asymmetric curved surface, not limited to the symmetric curved surface or flat surface.

When the liquid lens 400 has an asymmetric curved surface, the traveling direction of light may deviate from a central axis.

However, the curvature or diopter of the electro-wetting liquid lens 400 may change according to not only a potential difference, but also a pulse width applied to each of the electrodes 411 and 412 or the difference between pulse applying timings.

FIG. 6*a* is a conceptual sectional view illustrating the electro-wetting liquid lens of FIG. 5(*c*), taken along line A-A'.

The lower electrode 412 may include a plurality of electrodes 412*a*, 412*b*, 412*c*, and 412*d*. The plurality of electrodes 412*a*, 412*b*, 412*c*, and 412*d* may be sequentially arranged on the outer circumferential surface of the conductive solution 413 or the liquid 414. That is, the plurality of electrodes 412*a*, 412*b*, 412*c*, and 412*d* may be sequentially arranged in the shape of a hollow tube.

The use of the plurality of electrodes 412*a*, 412*b*, 412*c*, and 412*d* implies that different voltages may be applied, and thus the shape of the liquid lens may vary based on the above-described principle. In other words, different potential differences are applied to the plurality of electrodes 412*a*, 412*b*, 412*c*, and 412*d*. A high potential difference is formed at a location where the boundary of the liquid 414 is low, and a low potential difference is formed at a location where the boundary of the liquid 414 is high.

When the lower electrode 412 includes a plurality of electrodes, as many non-conductive layers 415 as the number of the lower electrodes 412 may be provided.

FIG. 6*b* is a conceptual sectional view illustrating the electro-wetting liquid lens of FIG. 5(*c*), taken along line B-B'.

Unlike the lower electrode 412, the upper electrode 411 may be provided as a single electrode that is not divided. The lower electrode 412 serves as a counterpart to the plurality of lower electrodes 412*a*, 412*b*, 412*c*, and 412*d* forming different potential differences.

FIG. 7 is an exemplary driving block diagram illustrating the optical device 200 including the electro-wetting liquid lens 400 related to the present disclosure.

The optical device 200 related to the present disclosure may include a lens curvature changing device 500 that changes the curvature of the electro-wetting liquid lens 400, an image sensor 530 that converts light from the electro-wetting liquid lens 400 into an electric signal, and an image processor 540 that performs image processing based on the electrical signal from the image sensor 530.

The optical device 200 related to the present disclosure may further include a gyro sensor 550.

The image processor 540 may output focus information about an image, and the gyro sensor 915 may output optical image stabilization (OIS) information.

The lens curvature changing device 500 according to an embodiment of the present disclosure may include a lens controller 510, a diopter driving unit 520, and a power supply 560.

The lens controller 510 sets a target diopter value for the electro-wetting liquid lens 400 based on the focus information received from the image processor 540, and specifies a voltage value or a pulse width corresponding to the diopter value, so that the diopter driving unit 520 may apply the voltage to the electro-wetting liquid lens 400.

Specifically, in operation of the lens curvature changing device 500, the lens controller 510 may output a pulse width variable signal V in response to a target diopter value, and the diopter driving unit 520 may output a corresponding voltage to the lower electrode and the upper electrode of the electro-wetting liquid lens 400 based on the pulse width variable signal V and a voltage Vx from the power supply unit 560.

This scheme of applying a voltage corresponding to a target diopter of the electro-wetting liquid lens 400 may be defined as an open loop system. A shortcoming with the scheme is that it may not be sensed whether the desired diopter value has been reached.

When the curvature of the electro-wetting liquid lens 400 needs to be changed to prevent shaking, the lens curvature variable device 500 of FIG. 7 may have difficulty in accurately changing the curvature because a curvature is not sensed.

FIG. 8 illustrates a cross-section of the optical device 200 related to the present disclosure. Referring to FIG. 8(*a*), the optical device of the present disclosure includes the image sensor 230 and the liquid lens 400. The image sensor 230 is a device that converts optical information to digital information. For the image sensor 230, an ultra-small semiconductor such as a metal oxide semiconductor (MOS) or a charge coupled device (CCD) may be used. A lens is located in front of the image sensor 230 so that an accurate image is formed on the image sensor 230, and the liquid lens 400 is used in the present disclosure.

The liquid lens 400 of the present disclosure includes the polar liquid 413 and the non-polar liquid 414 filled in a container including sidewalls, a first glass layer 416, and a second glass layer 417. The polar liquid 413 and the non-polar liquid 414 are not mixed and are divided into layers. The one pair of electrodes 411 and 412 may be located on the left and right sidewalls. The upper electrode 411 is covered with the insulating layer 415 so that it does not directly contact the polar liquid 413 or the non-polar liquid 414, whereas the lower electrode 412 contacts the polar liquid 413. When power is supplied to the upper electrode 411 and the lower electrode 412, charge is concentrated between the upper electrode 411 and the polar liquid 413 with the insulating layer 415 therebetween, as illustrated in FIG. 8(*a*). In order to increase an area over which the insulating layer 415 contacts the polar liquid 413, the interface between the polar liquid 413 and the non-polar liquid 414 is changed to be convex, as illustrated in FIG. 8(*b*).

The sidewalls of the present disclosure may have tapered surfaces that are narrower toward the image sensor 230 at positions corresponding to the lower electrode 412 and the insulating layer 415. As the liquid lens 400 of the present disclosure is a convex lens which collects light and transmit the collected light to the image sensor, the inclined sidewalls facilitate adjustment of the curvature of the interface, compared to vertical sidewalls. Since the contact area between the polar liquid 413 and the insulating layer 415 may be increased through the inclined surface, it is easy to change the curvature of the interface between the polar liquid 413 and the non-polar liquid 414.

In order to adjust the curvature of the interface, only one electrode module 220 including the upper electrode 411 and the lower electrode 412 is required. However, the present disclosure provides the liquid lens 400 which may change an optical axis formed by the curved surface of the interface between the polar liquid 413 and the non-polar liquid 414.

FIG. 9 is a diagram illustrating an electrode module 420 of the optical device 200 according to the present disclosure. A plurality of electrode modules 421 to 428 may be provided, which are arranged around the periphery of the liquid lens 400 to change the optical axis of the liquid lens 400.

Each of the electrode modules 421 to 428 includes the upper electrode 411 and the lower electrode 412 connected to a cathode and an anode of the power supply unit 190, respectively.

While the electrode modules 420 are shown in FIG. 9 as arranged at equal intervals, the interval between the electrode modules 420 may not be constant. Although eight electrode modules 420 are shown in FIG. 9, the number of electrode modules 420 may be equal to or larger than 8.

As illustrated in FIG. 9, the electrode modules 420 are located on sidewalls having inclined surfaces, and portions corresponding to the first glass are opened. For the convenience of description, the electrode modules 420 will be referred to as a first node 421 to an eighth node 228 in a clockwise direction.

As illustrated in FIG. 8, in order to change a focus by changing the curvature of the liquid lens 400 without changing the position of the optical axis of the interface, the same voltage $V_{AF}$ may be applied ($\Delta V_1$ to $\Delta V_8$ are 0) as voltages $V_1$ to $V_8$ for the electrode modules 420. As the voltage increases, the interface of the liquid lens 400 becomes more convex and the focal length becomes shorter.

The present disclosure is characterized in that the optical axis of light incident on the liquid lens 400 is changed by using the plurality of electrode modules 420. The optical axis is a path of light that becomes an image formation center and corresponds to a focal position. To adjust the optical axis, the shape of the interface between the polar solution and the non-polar solution may be changed by applying a different voltage to each of the electrode modules 421 to 428. The voltage applied to each electrode module may change the shape of the liquid lens interface by adjusting the compensation voltages $\Delta V_1$ to $\Delta V_8$ which are increased or decreased based on the reference voltage $V_{AF}$, when the optical axis is centered.

FIG. 10 is a diagram referred to for describing operation of a camera related to the present disclosure. When the mobile terminal 100 is shaken, the mobile terminal 100 of the present disclosure may adjust $\Delta V_1$ to $\Delta V_8$ to change the shape of the lens in correspondence with the shaking of the mobile terminal 100, so that a clear image is obtained by compensating for the shaking of the mobile terminal 100. This technique is called optical image stabilization (OIS). Conventionally, the lens is optically shifted or the image recognized by the image sensor 230 is electronically shifted, to correct shaking. In contrast, the shape of the interface of the liquid lens 400 may be adjusted in the present disclosure.

Since the interface of the liquid lens should be inclined in a manner that compensates for shaking of the mobile terminal, the compensation voltages of the electrode modules 420 positioned in a diagonal direction with respect to the center may be complementary voltages. For example, $\Delta V_5$ diagonal to $\Delta V_1$ may have a negative value of $\Delta V_1$, and $\Delta V_7$ diagonal to $\Delta V_3$ may have a negative value of $\Delta V_3$.

A motion of the mobile terminal 100 may be divided into an x-axis component θx and a y-axis component θy. When the electrode modules 420 are divided on an x-y plane, the first node 421 and the eighth node 428 in a first zone Zone_1 are located in the second quadrant and have -θx and +θy components, whereas the second node 422 and the third node 423 in a second zone, Zone_2 are located in the first quadrant and have +θx and +θy components.

The fourth node 424 and the fifth node 425 in a third zone Zone_3 are located in the fourth quadrant and have +θx and -θy components, whereas the sixth node 426 and the seventh node 427 in a fourth zone, Zone 4 are located in the third quadrant and have -θx and -θy components.

Accordingly, the first node 421 and the eighth node 228 located in the first zone, Z_1 may add a K(-θx+θy) value to the voltage value $V_{AF}$ set for a corresponding focal length. K is a compensation voltage coefficient, which may be determined by factors such as the curvature of the liquid lens 400 and the distance between the image sensor 230 and the liquid lens 400.

The fourth node 224 and the fifth node 425 located in the third zone, Z_3 may add a K(θx-θy) value to the voltage value $V_{AF}$. That is, the voltage of each electrode module 420 may be adjusted so that $\Delta V_{4,\,5} = -\Delta V_{8,1}$.

The voltages $\Delta V_2$ and $\Delta V_3$ applied to the electrode modules 420 in the second zone Z_2 may also have the negative values of the voltages $\Delta V_6$ and $\Delta V_7$ applied to the electrode modules 420 in the fourth zone Z_4. When the voltages are adjusted in this manner, the liquid lens 400 may compensate for shaking of the mobile terminal, so that a clear image may be obtained in the image sensor 230.

The use of the liquid lens 400 allows free changing of the curvature. With the resulting increased focus length control range, an ultra-close-up shot may be taken. FIG. 11 is a diagram illustrating a preview image output on the touch display 151 of the mobile terminal 100 related to the present disclosure. The preview image is obtained during ultra-close-up shooting.

The image becomes blurry from the center toward the edges because the center part is in good focus, but the edges experience distortion and thus are out of focus. Particularly as illustrated in FIG. 11, the corners are out of focus because they are far from the center in focus. The preview image output on the touch display 151 may be divided into four zones corresponding to the first to fourth zones of the liquid lens 400.

Since the electrodes of FIG. 9 are viewed from the front of the liquid lens 400, the top right zone of the preview image, that is, the zone of the first quadrant corresponds to the first zone of the liquid lens 400. The top left zone of the preview image corresponds to the second zone of the liquid lens 400. The bottom right zone of the preview image corresponds to the third zone of the liquid lens 400. The top left zone of the preview image corresponds to the fourth zone of the liquid lens 400.

As illustrated in FIG. 11, when one of the zones of the touch display 151 is selected to obtain an image clear at positions other than the center, the optical axis of the liquid lens 400 may be moved to focus on the corresponding positions in the present disclosure. An image clear in a part corresponding to the selected zone may be obtained without moving the mobile terminal 100.

When a zone for which the optical axis is to be moved is selected, the voltage of the electrode module 420 adjacent to the zone may be increased and the voltage of portions spaced from the zone may be decreased, to move the optical axis. The position of the optical axis may be adjusted by differentiating the voltage coefficients A, B, and C of the compensation voltages $\Delta V$ that compensate the voltages of the electrode modules 420.

In the case of ultra-close-up shooting, it is difficult to obtain an image with clear edges. Accordingly, it is important to maintain a constant curvature near the optical axis rather than a curvature at an outer portion. The voltage applied to an adjacent electrode module 420 on which the optical axis is located may be controlled to be constant so that the optical axis moves while the curvature near the optical axis of the liquid lens 400 illustrated in FIG. 8B is maintained.

FIGS. 12 to 15 are diagrams referred to for describing a method of controlling the liquid lens 400 of the mobile terminal 100 related to the present disclosure. FIG. 7 illustrates a voltage applied to each electrode module 420 when the first zone is selected, and FIG. 8 illustrates a voltage applied to each electrode module 420 when the second zone is selected. FIG. 9 illustrates a voltage applied to each electrode module 420 when the third zone is selected, and FIG. 10 illustrates a voltage applied to each electrode module 420 when the fourth zone is selected.

A position to be focused, that is, a zone to which the optical axis is to be moved may be selected by voice recognition or a user touch on the touch display 151. In this case, the mobile terminal 100 may be shaken by the user's hand tremors. When the user touches and selects a zone to which the optical axis of the liquid lens 400 is to be moved, the mobile terminal 100 may be shaken. Particularly in the case of ultra-close-up shooting, even a slight vibration leads to out-of-focus. Therefore, a clear image may be obtained only by compensating for the shaking.

Therefore, as illustrated in FIGS. 12 to 14, when the mobile terminal 100 moves by θ in FIG. 10, a compensation factor K(±θx±θy) may be included in the formula of calculating a voltage applied to each electrode module 420. That is, focus shift is performed simultaneously with shake correction in the present disclosure.

Referring to FIG. 12, when eight electrode modules 420 are included, compensation voltages $\Delta V_1$, $\Delta V_2$, $\Delta V_7$, and $\Delta V_8$ for voltages applied to four adjacent electrode modules 421, 422, 427, and 428 adjacent to a selected zone (first zone) may be calculated by multiplying a largest voltage coefficient A, whereas compensation voltages $\Delta V_4$ and $\Delta V_5$ for voltages applied to two electrode modules 424 and 425 farthest from the first zone may be calculated by multiplying a smallest voltage coefficient C. Compensation voltages $\Delta V_3$ and $\Delta V_6$ for voltages applied to the remaining electrode modules 423 and 226 may be calculated by multiplying a voltage coefficient B smaller than A and larger than C.

In FIG. 13, the compensation voltages $\Delta V_1$ to $\Delta V_8$ may be calculated by assigning weights to the electrode modules 421, 422, 423, and 224 adjacent to the second zone, and in FIG. 14, the compensation voltages $\Delta V_1$ to $\Delta V_8$ may be calculated by assigning weights to the electrode modules 425, 426, 427, and 428 adjacent to the third zone. In FIG. 13, the compensation voltages $\Delta V_1$ to $\Delta V_8$ may be calculated by assigning weights to the electrode modules 423, 424, 425, and 426 adjacent to the fourth zone.

Even if the optical axis moves in this manner, adjustment may be performed so that the curvature near the optical axis is maintained, only when at least two electrodes are arranged per zone to which the optical axis is to be moved. Therefore, as many electrode modules as or more electrode modules than the double of the number of divided zones may be included.

When the optical axis moves, a position at which an image is accurately formed is changed. Therefore, a clear image may be obtained by focusing on a desired part without moving the mobile terminal 100 during ultra-close-up shooting.

Further, as illustrated in FIGS. 12 to 15, images each having a zone focused may be obtained and synthesized into a whole clear image. A clearer ultra-close-up image may be obtained by solving the problem of blurring in out-of-focus edges of an image during ultra-close-up shooting.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A mobile terminal comprising:
 a case;
 an image sensor mounted in the case;
 a liquid lens located in front of the image sensor;
 a touch display located on one surface of the case and outputting a preview image input to the image sensor, and recognizing a touch input; and
 a controller configured to control the image sensor, the liquid lens, and the touch display,
 wherein the liquid lens comprises:
 a sidewall;
 a first glass layer and a second glass layer forming a container by covering one surface and the other surface of the sidewall;
 a plurality of electrode modules located on the sidewall and including an upper electrode and a lower electrode;
 an insulating layer covering the upper electrode;
 a non-polar liquid filled in the container; and
 a polar liquid layered with the polar liquid, filled in the container, and contacting the lower electrode,
 wherein as a voltage applied to an electrode module increases, an interface between the non-polar liquid and the polar liquid is changed to protrude toward the polar liquid, and the controller is configured to adjust the position of a protrusion of the interface by controlling at least a part of voltages applied to the plurality of electrode modules to be different, wherein when a first zone of the preview image is selected, the controller is further configured to control the plurality of electrode modules to protrude the interface of the polar liquid at a position corresponding to the first zone, and wherein the controller is further configured to set a position at which a touch input is sensed on the touch display as a first point.

2. The mobile terminal according to claim 1, wherein the plurality of electrode modules are arranged along a periphery of the liquid lens, and the number of the plurality of electrode modules is 8 or larger.

3. The mobile terminal according to claim 1, wherein each of the voltages applied to the electrode modules includes a focus voltage $V_{AF}$ corresponding to a focus which has been set and a compensation voltage $\Delta V$ compensating for shaking of the mobile terminal.

4. The mobile terminal according to claim 3, wherein the first zone includes one of a plurality of zones divided from the preview image, and the electrode modules include at least two of electrode modules one to one corresponding to the plurality of zones.

5. The mobile terminal according to claim 4, wherein the controller is configured to control voltages of a plurality of first electrode modules including an electrode module corresponding to the first zone and an electrode module corresponding to a zone adjacent to the first zone to be lower than a voltage of a second electrode module corresponding to a second zone apart from the first zone in a diagonal direction.

6. The mobile terminal according to claim 5, wherein a first voltage coefficient A for the compensation voltages of the first electrode modules is larger than a second voltage coefficient C for the second electrode module.

7. The mobile terminal according to claim 6, wherein a third voltage coefficient B for a third electrode module other than the first electrode module and the second electrode module is smaller than the first voltage coefficient A and smaller than the second voltage coefficient C.

8. The mobile terminal according to claim 1, wherein a curvature center of the protrusion of the interface after the first point is set is different from a curvature center of the protrusion of the interface before the first point is set.

9. The mobile terminal according to claim 1, wherein the controller is configured to, upon sensing a command for storing the preview image, obtain a plurality of preview images by adjusting the voltages of the electrode modules to change the position of the protrusion of the interface, and control an image obtained by combining images corresponding to the protrusion in the preview images to be stored.

10. The mobile terminal according to claim 1, wherein the sidewall has an inclined surface which becomes narrower toward the first glass layer.

11. The mobile terminal according to claim 1, wherein the non-polar liquid has a larger refractive index than the polar liquid.

* * * * *